(No Model.)

T. B. WARD.
CLOTHES DRIER.

No. 425,355. Patented Apr. 8, 1890.

Witnesses:
E. P. Ellis,
B. Brockett,

Inventor:
Thos. B. Ward,
per F. A. Lehmann,
atty.

UNITED STATES PATENT OFFICE.

THOMAS B. WARD, OF PRAIRIE DU CHIEN, WISCONSIN.

CLOTHES-DRIER.

SPECIFICATION forming part of Letters Patent No. 425,355, dated April 8, 1890.

Application filed January 31, 1890. Serial No. 338,761. (No model.)

*To all whom it may concern:*

Be it known that I, THOMAS B. WARD, of Prairie du Chien, in the county of Crawford and State of Wisconsin, have invented certain new and useful Improvements in Clothes-Driers; and I do hereby declare the following to be a full, clear, and exact description of the invention, such as will enable others skilled in the art to which it pertains to make and use it, reference being had to the accompanying drawings, which form part of this specification.

My invention relates to an improvement in stove-pipe clothing-driers; and it consists in the combination of a suitably-notched bar, frame, or casting, which is fastened to the stove-pipe by means of a wire, and a suitable number of arms, which are provided at their inner ends with hooks to catch over the bar or casting and supports to hold the arms in a horizontal position, as will be more fully described hereinafter.

The object of my invention is to produce a clothes-drier which can be attached directly to the stove-pipe, and which will support small articles of clothing and other devices above the stove for the purpose of being dried.

Figure 1:
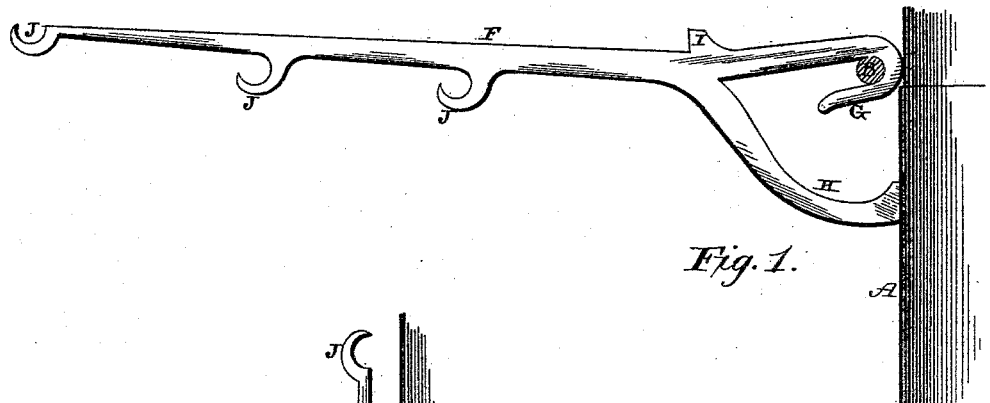
Figure 2:
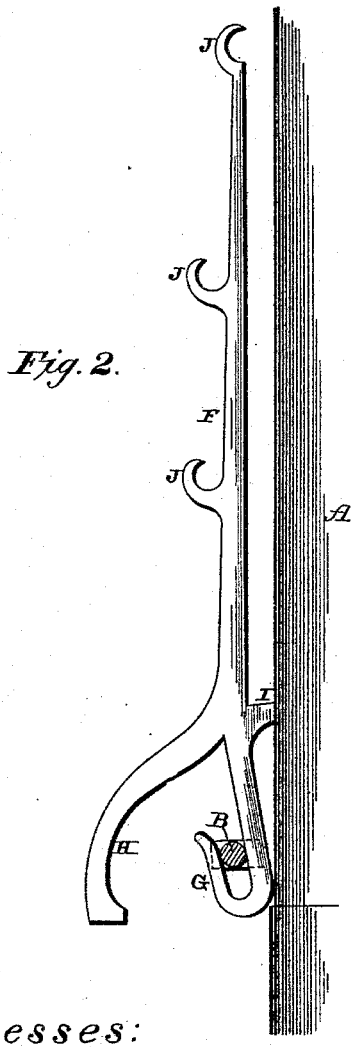
Figure 3:

Figure 1 is a side elevation of a drier which embodies my invention, the arm being shown in a horizontal position. Fig. 2 is a similar view showing the arm in a raised position. Fig. 3 is a perspective of the bar or frame for supporting the arms.

A represents an ordinary stove-pipe, and B the metallic bar or frame, which is secured in direct contact therewith by means of a wire C, which extends entirely around the stove-pipe. This bar is attached to the stove-pipe above one of the joints at any suitable distance above the top of the stove, so that the rising currents of heat will dry the articles hung upon the drier for this purpose. In this bar are formed a suitable number of notches or recesses D, corresponding to the number of arms that are used, and in which notches or recesses the arms F are hooked. Each one of the arms F has its inner end pronged, as shown, and one of these prongs is formed into a hook G for catching over the bar and the other into a support or brace H, which helps to hold or support the arms in a horizontal position by bearing directly against the side of the stove-pipe A. The hook is shaped, as shown, so that it can be made to catch over one of the recessed portions of the bar and turn freely thereon through a quarter of a circle. When the arm F is raised into the position shown in Fig. 2, the hook does not bind against the stove-pipe; but when the arm is lowered into the position shown in Fig. 1, it serves to bind slightly against the pipe, so as to assist in supporting the whole drier in position and prevent it from having any tendency to slide or move downward. Upon the upper edge of each of the arms F is formed a stop I, which strikes against the side of the pipe when the arm is raised into a vertical position, and thus prevents the arm from bearing against the pipe to such an extent as to become heated sufficiently to be unpleasant to handle. On the outer end of each arm and at suitable points upon its under edge are formed the hooks J, upon which small articles—such as gloves, stockings, and handkerchiefs—may be hung. Over the top of one or more of the arms may be hung large articles of clothing to be dried. On these arms may also be hung berries to be dried and articles of all kinds. There may be any desired number of the arms, and each arm may be provided with any suitable number of hooks.

By reason of the peculiar construction of the different parts the drier will, by its own weight when bars are lowered to a horizontal position, attach itself to stove-pipe at any desired point above the first joint, and when not in use the bars may be raised parallel with pipe and pushed downward, forming a key or wedge, holding the drier at any desired place on pipe. When not in use, the bars can be raised parallel with the pipe, as shown in Fig. 2, thus being entirely out of the way in working around the pipe.

Having thus described my invention, I claim—

1. The combination of the bar, the wire for attaching it to the stove-pipe, and the arms F, provided with hooks G and the braces H at their inner ends, substantially as shown.

2. The combination of the notched or recessed bar, a wire for securing it to the stove-pipe, the arms F, provided with the hooks G and the braces H upon their inner ends, and the stops I, substantially as described.

In testimony whereof I affix my signature in presence of two witnesses.

THOMAS B. WARD.

Witnesses:
C. E. ALDER,
R. F. HASKINS.